United States Patent
Imanari

(10) Patent No.: US 8,354,192 B2
(45) Date of Patent: Jan. 15, 2013

(54) ELECTRODE ACTIVE MATERIAL, ELECTRODE, AND NONAQUEOUS ELECTROLYTE SECONDARY BATTERY

(75) Inventor: Yuichiro Imanari, Tsukuba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/060,197

(22) PCT Filed: Aug. 28, 2009

(86) PCT No.: PCT/JP2009/065456
§ 371 (c)(1),
(2), (4) Date: Feb. 22, 2011

(87) PCT Pub. No.: WO2010/027038
PCT Pub. Date: Mar. 11, 2010

(65) Prior Publication Data
US 2011/0151327 A1      Jun. 23, 2011

(30) Foreign Application Priority Data

Sep. 2, 2008   (JP) ................................. 2008-224473
Jun. 4, 2009   (JP) ................................. 2009-134834

(51) Int. Cl.
*H01M 4/52* (2010.01)

(52) U.S. Cl. .................................. 429/221; 429/231.95

(58) Field of Classification Search ............. 429/231.95, 429/223, 224, 220, 231.3, 231.2, 217, 221
See application file for complete search history.

(56) References Cited

U.S. PATENT DOCUMENTS

| | | | |
|---|---|---|---|
| 7,214,449 B2 * | 5/2007 | Sato et al. | ................ 429/231.95 |
| 7,374,841 B2 | 5/2008 | Hosoya et al. | |
| 7,951,490 B2 | 5/2011 | Hosoya et al. | |
| 2003/0180618 A1 * | 9/2003 | Inoue et al. | ................ 429/231.1 |
| 2004/0058244 A1 | 3/2004 | Hosoya et al. | |
| 2005/0266315 A1 | 12/2005 | Sato et al. | |

FOREIGN PATENT DOCUMENTS

| | | |
|---|---|---|
| JP | 2001-135314 A | 5/2001 |
| JP | 2001-167766 A | 6/2001 |
| JP | 2002-319398 A | 10/2002 |
| JP | 2003-173776 A | 6/2003 |
| JP | 2005-339970 A | 12/2005 |

OTHER PUBLICATIONS

Translation of Written Opinion of the International Searching Authority dated Apr. 12, 2011 in Application No. PCT/JP2009/065456.
Machine Translation of JP 2001-135314A previously filed in IDS dated Feb. 22, 2011.
Machine Translation of JP 2002-319398A previously filed in IDS dated Feb. 22, 2011.
Machine Translation of JP 2001-167766A previously filed in IDS dated Feb. 22, 2011.

* cited by examiner

*Primary Examiner* — Jennifer K Michener
*Assistant Examiner* — Monique Wills
(74) *Attorney, Agent, or Firm* — Sughrue Mion, PLLC

(57) ABSTRACT

The present invention provides an electrode active material, an electrode and a nonaqueous electrolyte secondary battery. The electrode active material comprises a mixture of 10 parts by weight to 900 parts by weight of a first lithium mixed metal oxide and 100 parts by weight of a second lithium mixed metal oxide, wherein the first lithium mixed metal oxide is in a powder form and has a BET specific surface area of 3 $m^2$/g or more and 30 $m^2$/g or less, and the second lithium mixed metal oxide is in a powder form and has a BET specific surface area of 0.1 $m^2$/g or more and 2 $m^2$/g or less.

12 Claims, No Drawings

ELECTRODE ACTIVE MATERIAL, ELECTRODE, AND NONAQUEOUS ELECTROLYTE SECONDARY BATTERY

CROSS REFERENCE TO RELATED APPLICATION

This application is a National Stage of International Application No. PCT/JP2009/065456 filed on Aug. 28, 2009, claiming priority based on Japanese Patent Application Nos. 2008-224473, filed Sep. 2, 2008 and 2009-134834, filed Jun. 4, 2009, the contents of all of which are incorporated herein by reference in their entirety.

TECHNICAL FIELD

The present invention relates to an electrode active material, an electrode and a nonaqueous electrolyte secondary battery.

BACKGROUND ART

An electrode active material is used for electrodes in nonaqueous electrolyte secondary batteries such as a lithium secondary battery. The lithium secondary battery has already been put into commercial use as a power source for cellular phones, laptop computers and the like, and also an attempt is made to use as middle and large power sources for automobiles and electric power storage and the like.

As an electrode active material of the prior art, JP-A-2003-173776 (0083-0086) describes an electrode active material in which a highly stable lithium mixed metal oxide having a specific surface area of 2.4 m²/g and a highly conductive lithium mixed metal oxide having a specific surface area of 0.4 m²/g are mixed, and also describes that the specific surface area of any lithium mixed metal oxide is preferably adjusted to 2.0 m²/g or less.

DISCLOSURE OF THE INVENTION

However, a nonaqueous electrolyte secondary battery obtained by using the above electrode active material still leaves much room for improvement in applications that require a high output in a high current rate, that is, automobiles and power tools such as electrical tools. An object of the present invention is to provide an electrode active material that gives a nonaqueous electrolyte secondary battery capable of showing a high power output at a high current rate.

The present inventors intensively studied so as to achieve the above object, and thus the present invention has been accomplished. The present invention provides the followings.

<1> An electrode active material including a mixture of 10 parts by weight to 900 parts by weight of a first lithium mixed metal oxide and 100 parts by weight of a second lithium mixed metal oxide, wherein
the first lithium mixed metal oxide is in a powder form and has a BET specific surface area of 3 m²/g or more and 30 m²/g or less, and
the second lithium mixed metal oxide is in a powder form and has a BET specific surface area of 0.1 m²/g or more and 2 m²/g or less.

<2> The electrode active material according to <1>, wherein the first lithium mixed metal oxide is constituted of primary particles having a diameter within a range of 0.01 μm or more and 0.5 μm or less, and aggregated particles having an average diameter of 0.05 μm or more and 2 μm or less formed by aggregating primary particles having a diameter within the above range.

<3> The electrode active material according to <1> or <2>, wherein the first lithium mixed metal oxide contains Fe.

<4> The electrode active material according to <3>, wherein the first lithium mixed metal oxide is represented by the formula (1):

$$Li(Ni_{1-x-y}Mn_xFe_y)O_2 \quad (1)$$

wherein, x is more than 0 and less than 1,
y is more than 0 and less than 1, and
x+y is more than 0 and less than 1.

<5> The electrode active material according to <4>, wherein x is 0.1 or more and 0.7 or less, y is 0.01 or more and 0.5 or less, and x+y is 0.11 or more and less than 1.

<6> The electrode active material according to any one of <1> to <5>, wherein the second lithium mixed metal oxide is constituted of primary particles having a diameter within a range of 0.1 μm or more and 1 μm or less, and aggregated particles having an average diameter of 3 μm or more and 20 μm or less formed by aggregating primary particles having a diameter within the above range.

<7> The electrode active material according to any one of <1> to <6>, wherein the second lithium mixed metal oxide contains Ni or Co.

<8> The electrode active material according to <7>, wherein the second lithium mixed metal oxide is represented by the formula (2):

$$Li(Ni_{1-a-b}Co_aM_b)O_2 \quad (2)$$

wherein, M represents one or more kinds selected from the group consisting of Ti, V, Mn, B, Al and Ga, a is 0 or more and 1 or less, b is 0 or more and 0.5 or less, and a+b is 0 or more and less than 1.

<9> An electrode including the electrode active material according to any one of <1> to <8>.

<10> A nonaqueous electrolyte secondary battery including the electrode according to <9> as a positive electrode.

<11> The nonaqueous electrolyte secondary battery according to <10>, further including a separator.

<12> The nonaqueous electrolyte secondary battery according to <11>, wherein the separator includes a laminate film in which a heat resistant porous layer and a porous film are stacked each other.

<13> An electrode active material which is obtained by mixing a powdery first lithium mixed metal oxide having a BET specific surface area of 3 m²/g or more and 30 m²/g or less with a powdery second lithium mixed metal oxide having a BET specific surface area of 0.1 m²/g or more and 2 m²/g or less in a mixing ratio of 10 parts by weight or more and 900 parts by weight or less of the first lithium mixed metal oxide per 100 parts by weight of the second lithium mixed metal oxide.

MODE FOR CARRYING OUT THE INVENTION

Electrode Active Material

The electrode active material of the present invention contains a mixture of a first lithium mixed metal oxide and a second lithium mixed metal oxide, and is usually obtained by mixing 10 parts by weight or more and 900 parts by weight or less of the first lithium mixed metal oxide with 100 parts by weight of the second lithium mixed metal oxide.

In order to obtain a nonaqueous electrolyte secondary battery in which rate property is more improved, the amount of the first lithium mixed metal oxide is preferably 40 parts by weight or more and 800 parts by weight or less, more preferably 100 parts by weight or more and 700 parts by weight or less, and still more preferably 200 parts by weight or more and 600 parts by weight or less, relative to 100 parts by weight of the second lithium mixed metal oxide.

Mixing may be carried out by either dry mode mixing or wet mode mixing, and from the standpoint of simplicity, dry mode mixing is preferable. The mixing apparatus can include a stirring mixer, a V-shaped mixer, a W-shaped mixer, a ribbon mixer, a drum mixer, a ball mill and the like.

The first lithium mixed metal oxide and the second lithium mixed metal oxide will be described below.

First Lithium Mixed Metal Oxide

The first lithium mixed metal oxide is in a powder form and has a BET specific surface area of 3 $m^2/g$ or more and 30 $m^2/g$ or less. In case the BET specific surface area of the first lithium mixed metal oxide is less than 3 $m^2/g$, the resultant nonaqueous electrolyte secondary battery has not sufficient rate property. In contrast, in case the BET specific surface area is more than 30 $m^2/g$, since filling density of an electrode active material used for an electrode may decrease, the resultant nonaqueous electrolyte secondary battery has not sufficient rate property and it becomes difficult to obtain a large discharge capacity.

In order to obtain a nonaqueous electrolyte secondary battery in which rate property is more improved, the BET specific surface area of the first lithium mixed metal oxide is preferably 3 $m^2/g$ or more and 15 $m^2/g$ or less, and more preferably 5 $m^2/g$ or more and 10 $m^2/g$ or less.

The first lithium mixed metal oxide is preferably constituted of a primary particles having a diameter within a range of 0.01 μm or more and 0.5 μm or less, and aggregated particles having an average diameter of 0.05 μm or more and 2 μm or less formed by aggregating primary particles having a diameter within the above range, more preferably constituted of a primary particles having a diameter within a range of 0.02 μm or more and 0.4 μm or less, and aggregated particles having an average diameter of 0.1 μm or more and 1.5 μm or less formed by aggregating primary particles having a diameter within the above range, and still more preferably constituted of a primary particles having a diameter within a range of 0.05 μm or more and 0.35 μm or less, and aggregated particles having an average diameter of 0.2 μm or more and 1 μm or less formed by aggregating primary particles having a diameter within the above range.

Use of such a first lithium mixed metal oxide enables a further improvement in a rate property of the nonaqueous electrolyte secondary battery and a further increase in a discharge capacity.

The diameter of primary particles and the average diameter of aggregated particles can be measured by a scanning electron micrograph (SEM micrograph). The average diameter of aggregated particles formed by aggregating primary particles is determined by arbitrarily extracting 50 particles from aggregated particles photographed in a SEM micrograph, measuring a particle diameter of the individual particles, and then calculating the average value of particle diameters of the 50 particles.

The first lithium mixed metal oxide preferably contains at least Fe. In the first lithium mixed metal oxide, it is also possible to give a nonaqueous electrolyte secondary battery having excellent rate property without using an expensive Co raw material as a metal element for a positive electrode active material.

More specifically, the first lithium mixed metal oxide is preferably represented by the formula (1):

$$Li(Ni_{1-x-y}Mn_xFe_y)O_2 \qquad (1)$$

wherein, x is more than 0 and less than 1, y is more than 0 and less than 1, and x+y is more than 0 and less than 1.

Since there is a tendency that discharge capacity of the resultant nonaqueous electrolyte secondary battery becomes larger and rate property is more improved, it is preferred that x be 0.1 or more and 0.7 or less, y be 0.01 or more and 0.5 or less, and x+y be 0.11 or more and less than 1 in the formula (1). X is more preferably 0.2 or more and 0.5 or less, and still more preferably 0.3 or more and 0.5 or less. Y is more preferably 0.05 or more and 0.3 or less, and still more preferably 0.07 or more and 0.2 or less.

The lithium mixed metal oxide represented by the formula (1) usually has a hexagonal crystal structure, and the crystal structure belongs to the R-3m space group. The crystal structure can be identified by the measurement of powder X-ray diffraction using CuKα as a radiation source.

In a range not impairing the effect of the present invention, a part of metal elements excluding Li in the first lithium mixed metal oxide represented by the formula (1) may be substituted by other elements. Other elements can include, for example, B, Al, Ti, V, Ga, In, Si, Ge, Sn, Mg, Sc, Y, Zr, Hf, Nb, Ta, Cr, Mo, W, Tc, Ru, Rh, Ir, Pd, Cu, Ag and Zn. Preferred other elements include, for example, Ti, V, Mg, Sc, Y, Zr, Cr, Mo, W, Cu, Ag and Zn.

Onto the surface of particles constituting the first lithium mixed metal oxide, a compound different from the first lithium mixed metal oxide may be adhered. Examples of the compound include compounds containing one or more elements selected from the group consisting of B, Al, Ga, In, Si, Ge, Sn, Mg and transition metal elements, preferably compounds containing one or more elements selected from the group consisting of B, Al, Mg, Ga, In and Sn, and still more preferably compounds of Al. Specific examples of the compound can include oxides, hydroxides, oxyhydroxides, carbonates, nitrates and organic acid salts of the above-described elements compound, and preferably oxides, hydroxides and oxyhydroxides. These compounds may be used singly, or in admixture of two or more. Among these compounds, alumina is a particularly preferable compound. Heating may be carried out after adhesion of particles constituting the first lithium mixed metal oxide.

Second Lithium Mixed Metal Oxide

The second lithium mixed metal oxide is also in a powder form, but the BET specific surface area is different from that of the first lithium mixed metal oxide and is 0.1 $m^2/g$ or more and 2 $m^2/g$ or less. In case the BET specific surface area of the second lithium mixed metal oxide is less than 0.1 $m^2/g$ or more than 2 $m^2/g$, since filling balance with the first lithium mixed metal oxide may deteriorate, there is a tendency that rate property of the resultant nonaqueous electrolyte secondary battery scarcely becomes sufficient and also discharge capacity decreases.

In order to obtain a nonaqueous electrolyte secondary battery in which rate property is more improved, the BET specific surface area of the second lithium mixed metal oxide is preferably 0.2 $m^2/g$ or more and 1.5 $m^2/g$ or less, and more preferably 0.3 $m^2/g$ or more and 1 $m^2/g$ or less.

The second lithium mixed metal oxide is preferably constituted of a primary particles having a diameter within a range of 0.1 μm or more and 1 μm or less, and aggregated particles having an average diameter within a range of 3 μm or more and 20 μm or less formed by aggregating primary particles having a diameter within the above range, more preferably constituted of a primary particles having a diameter within a range of 0.2 µm or more and 0.8 µm or less, and aggregated particles having an average diameter within a range of 5 µm or more and 15 µm or less formed by aggregating primary particles having a diameter within the above range, and still more preferably constituted of a primary particles having a diameter within a range of 0.3 µm or more and 0.7 µm or less, and aggregated particles having an average diameter within a range of 7 µm or more and 12 µm or less formed by aggregating primary particles having a diameter within the above range. By setting the second lithium mixed metal oxide as described above, it is possible to further improve rate property of the resultant nonaqueous electrolyte secondary battery and to further increase discharge capacity.

The diameter of primary particles and the average diameter of aggregated particles can be measured by a scanning electron micrograph (SEM micrograph). The average diameter of aggregated particles formed by aggregating primary particles is determined by arbitrarily extracting 50 particles from aggregated particles photographed in a SEM micrograph, measuring a particle diameter of the individual particles, and then calculating the average value of particle diameters of the 50 particles.

Since a nonaqueous electrolyte secondary battery having higher discharge capacity is obtained, the second lithium mixed metal oxide preferably contains at least Ni or Co.

More specifically, the second lithium mixed metal oxide is preferably represented by the formula (2):

$$Li(Ni_{1-a-b}Co_aM_b)O_2 \qquad (2)$$

wherein, M represents one or more kinds selected from the group consisting of Ti, V, Mn, B, Al and Ga, a is a value within a range of 0 or more and 1 or less, b is a value within a range of 0 or more and 0.5 or less, and a+b is 0 or more and less than 1.

Since there is a tendency that discharge capacity of the resultant nonaqueous electrolyte secondary battery further increases and rate property is more improved, a is preferably 0.05 or more and 0.3 or less, and more preferably 0.1 or more and 0.2 or less in the formula (2).

b is preferably 0 or more and 0.45 or less, and more preferably 0 or more and 0.4 or less.

In the formula (2), M is preferably Mn and/or Al, and more preferably Al.

The lithium mixed metal oxide represented by the formula (2) usually has a hexagonal crystal structure, and the crystal structure belongs to the R-3m space group. The crystal structure can be identified by measuring powder X-ray diffraction using CuKα as a radiation source.

In a range not impairing the effect of the present invention, a part of metal elements excluding Li in the second lithium mixed metal oxide represented by the formula (2) may be substituted by other elements. Other elements can include, for example, B, Al, Ti, V, Ga, In, Si, Ge, Sn, Mg, Sc, Y, Zr, Hf, Nb, Ta, Cr, Mo, W, Tc, Ru, Rh, Ir, Pd, Cu, Ag and Zn. Preferred other elements include, for example, In, Sn, Mg, Cr, Mo, W, Cu, Ag and Zn.

Onto the surface of particles constituting the second lithium mixed metal oxide, a compound different from the second lithium mixed metal oxide may be adhered. Examples of the compound can include compounds containing one or more elements selected from the group consisting of B, Al, Ga, In, Si, Ge, Sn, Mg and transition metal elements, and preferably compounds containing one or more elements selected from the group consisting of B, Al, Mg, Ga, In and Sn, and still more preferably compounds of Al. Specific examples of the compound can include oxides, hydroxides, oxyhydroxides, carbonates, nitrates and organic acid salt of the above-described elements compound, and preferably oxides, hydroxides and oxyhydroxides. These compounds may be used singly, or in admixture of two or more. Among these compounds, alumina is a particularly preferable compound. Heating may be carried out after adhesion of particles constituting the second lithium mixed metal oxide.

Method for Producing First and Second Lithium Mixed Metal Oxides

The first lithium mixed metal oxide and the second lithium mixed metal oxide (hereinafter, generically referred to as a lithium mixed metal oxide in some cases) can be prepared, for example, by calcining a raw material containing the respective constituting metal elements in a prescribed ratio.

The BET specific surface area of the lithium mixed metal oxide can be controlled by a calcination temperature, although it varies depending on the kind of the constituting metal elements. The raw material may be a mixture of compounds of the constituting respective metal elements, and a mixed compound containing a plurality of metal elements may be used as the compound. It is possible to use, as the compound of metal elements, oxides of metal elements, or those which can be decomposed and/or oxidized at a high temperature into oxides, such as hydroxides, oxyhydroxides, carbonates, nitrates, acetates, halides, oxalates and alkoxides.

The BET specific surface area of the lithium mixed metal oxide, the diameter of primary particles and the average diameter of aggregated particles can also be controlled by inclusion of a reaction accelerator in the raw material before calcination. The reaction accelerator includes, for example, chlorides such as NaCl, KCl and NH$_4$Cl, fluorides such as LiF, NaF, KF and HN$_4$F, boron oxide, boric acid, preferably chlorides, and more preferably KCl. Usually, when the calcination temperature is the same, in case the content of a reaction accelerator in the raw material becomes larger, the BET specific surface area tends to become smaller. Also, the diameter of primary particles and the average diameter of aggregated particles tend to become larger. Two or more reaction accelerators can be used in combination. The reaction accelerator may remain in a lithium mixed metal oxide, or may be removed by washing, evaporation and the like after calcination.

The calcination temperature is preferably 600° C. or higher and 1100° C. or lower, and more preferably 650° C. or higher and 900° C. or lower. The retention time of the calcination temperature is usually from 0.1 to 20 hours, and preferably from 0.5 to 8 hours. The temperature rise rate up to the calcination temperature is usually from 50° C. to 400° C./hour, and the temperature fall rate from the calcination temperature to room temperature is usually from 10° C. to 400° C./hour. The calcination atmosphere is, for example, air, oxygen, nitrogen, argon or a mixed gas thereof, and preferably air.

After the calcination, the lithium mixed metal oxide can be pulverized using a ball mill, jet mill and the like. The BET specific surface area of the lithium mixed metal oxide can be controlled by pulverization in some cases. Pulverization or calcination may be repeatedly conducted twice or more. The lithium mixed metal oxide can also be washed or classified, if necessary. In a range not impairing the effect of the present invention, one or more other lithium mixed metal oxides may be mixed.

For example, in case preferred lithium mixed metal oxide represented by the formula (1) is prepared as the first lithium mixed metal oxide, a mixture containing a lithium compound, a nickel compound, a manganese compound and an iron compound in a molar ratio Li:Ni:Mn:Fe of 1:(1-x-y):x:y may be calcinated. The lithium compound can include lithium hydroxide monohydrate, the nickel compound can include nickel hydroxide, the manganese compound can include manganese dioxide, and the iron compound can include iron sesquioxide, respectively. The calcination temperature can include 600° C. to 1,000° C.

For example, in case preferred lithium mixed metal oxide represented by the formula (2) is prepared as the second lithium mixed metal oxide, a mixture containing a lithium compound, a nickel compound, a cobalt compound and an M compound (or an M compound mixture) in a molar ratio Li:Ni:Co:M of 1:(1-a-b):a:b may be calcinated. The lithium compound can include lithium hydroxide monohydrate, the nickel compound can include nickel hydroxide, the cobalt compound can include tricobalt tetraoxide, and the M compound can include aluminum oxide in case M is Al, or manganese dioxide in case M is Mn. The calcination temperature can include 700° C. to 1,000° C.

Mixing may be carried out by either dry mode mixing or wet mode mixing, and from the standpoint of simplicity, dry mode mixing is preferable. The mixing apparatus can include a stirring mixer, a V-shaped mixer, a W-shaped mixer, a ribbon mixer, a drum mixer, a ball mill and the like.

The mixed compound includes a coprecipitate obtained by a coprecipitation reaction, for example, a method including a step (a) and a step (b):

(a) a step of bringing an aqueous solution containing a plurality of metal elements into contact with an alkali to yield a coprecipitate slurry, and (b) a step of recovering a coprecipitate from the coprecipitate slurry.

The aqueous solution containing a plurality of metal elements in the step (a) may contain, for example, Ni, Mn and Fe in a prescribed molar ratio in the case of obtaining a lithium mixed metal oxide represented by the formula (1), and may be prepared by dissolving these water-soluble compounds in water. For example, nickel chloride is used as a nickel compound, manganese chloride is used as a manganese compound and iron chloride is used as an iron compound, or hydrates thereof are used, and the aqueous solution may be prepared by dissolving these compounds in water. Also, in the case of obtaining a lithium mixed metal oxide represented by the formula (2), Ni, Co and M may be contained in a prescribed molar ratio, for example, nickel chloride is used as a nickel compound, cobalt nitrate is used as a cobalt compound, and aluminum sulfate is used as an M compound in case M is Al, or manganese chloride is used in case M is Mn, or hydrides thereof are used, and the aqueous solution may be prepared by dissolving these compounds in water. Also, in the case of using compounds which are hardly soluble in water, such as hydroxides, acid hydroxides and oxides, the aqueous solution may be prepared by dissolving these compounds in an acid such as hydrochloric acid. Also, two or more kinds among a water-soluble compound, a compound which is hardly soluble in water, and a metallic material may be used in combination.

Examples of the alkali in the step (a) include LiOH (lithium hydroxide), NaOH (sodium hydroxide), KOH (potassium hydroxide), $NH_3$ (ammonia), $Na_2CO_3$ (sodium carbonate), $K_2CO_3$ (potassium carbonate) and $(NH_4)_2CO_3$ (ammonium carbonate). These compounds may be anhydrides or hydrate. Also, these compounds may be used singly, or in admixture of two or more. Usually, these compounds are used in the form of an aqueous solution after dissolving in water. The concentration of the alkali in the aqueous solution is usually from about 0.1 to 20 M, and preferably from about 0.5 to 10 M. It is preferable from the standpoint of reduction of impurities in an electrode active material to use an anhydride and/or a hydrate of LiOH, as the alkali. It is preferable from the standpoint of reduction of production cost to use an anhydride and/or a hydrate of KOH, as the alkali. Two or more alkalis may be used in combination.

When a coprecipitate is produced by bringing an aqueous solution containing a plurality of metal elements into contact with an alkali in the step (a), in order to obtain a coprecipitate having a uniform particle size, it is preferred to stir a mixed solution containing the coprecipitate prepared by mixing the aqueous solution containing a plurality of metal elements with an aqueous solution of an alkali. In this case, while measuring the pH of the mixed solution containing the coprecipitate, the amounts of an aqueous transition metal solution and an aqueous solution of an alkali to be introduced are adjusted. From the standpoint of obtaining a coprecipitate having a uniform particle size, in the step (a), the measured pH is preferably 11 or more and 13 or less.

In the step (b), a coprecipitate is recovered from the coprecipitate slurry. The step (b) may be carried out by any method providing a coprecipitate can be recovered, and from the standpoint of operability, methods according to solid-liquid separation such as filtration are preferably used. A coprecipitate can be recovered also by methods of volatilizing liquid with heating such as spray drying, using a coprecipitate slurry.

In the case of obtaining the coprecipitate by solid-liquid separation, the coprecipitate slurry is preferably washed and dried after solid-liquid separation. In the case of the presence of alkali, Cl and the like in excess quantity in the coprecipitate obtained after solid-liquid separation, these can be removed by washing. For washing the coprecipitate efficiently, it is preferable to use water as the washing solution. If necessary, water-soluble organic solvents such as alcohols and acetones may added to the washing solution. Washing may be carried out twice or more, and for example, it is possible that washing is carried out with water, and then washing is again carried out with the water-soluble organic solvent.

Although drying is usually carried out by a thermal treatment, it may also be carried out by air blast drying, vacuum drying and the like. In the case of the thermal treatment, it is carried out usually at from 50° C. to 300° C., preferably at about from 100° C. to 200° C.

The coprecipitate thus obtained is used as a mixed compound and a mixture obtained by mixing this coprecipitate with a lithium compounds is calcined in the same manner as described above to yield a lithium mixed metal compound. Examples of the lithium compound include lithium hydroxide, lithium chloride, lithium nitrate and lithium carbonate. These compounds may be anhydrides or hydrates. These compounds may be used singly, or in admixture of two or more. Mixing may be carried out by either dry mode mixing or wet mode mixing, and from the standpoint of simplicity, dry mode mixing is preferable. The mixing apparatus can include a stirring mixer, a V-shaped mixer, a W-shaped mixer, a ribbon mixer, a drum mixer, a ball mill and the like.

Electrode

The electrode of the present invention contains the above electrode active material. The electrode can be used as an electrode in a nonaqueous electrolyte secondary battery, and is particularly useful as a positive electrode in a nonaqueous electrolyte secondary battery.

The electrode can be usually produced by supporting an electrode mixture containing an electrode active material, a binder and, if necessary, an electrically conductive material on an electrode current collector.

Electrically Conductive Material

As the electrically conductive material, carbonaceous materials can be used, and the carbonaceous materials can include a graphite powder, carbon black, acetylene black, filamentous carbon material and the like. Carbon black and acetylene black can be added in a small amount into an electrode mixture to enhance the electric conductivity in an electrode and to improve charge and discharge efficiency and rate property since carbon black and acetylene black are composed of fine particles and have large surface area, however, when added in a too large amount, an adhesion property by a binder between an electrode mixture and an electrode current collector is lowered, leading to a cause for increase in internal resistance. Usually, the proportion of an electrically conductive material in an electrode mixture is 5 parts by weight or more and 20 parts by weight or less relative to 100 parts by weight of the electrode active material. In the case of use of a filamentous carbon material such as graphitized carbon fiber and carbon nanotube as the electrically conductive material, it is also possible to decrease this proportion.

Binder

As the above-described binder, thermoplastic resins can be used, and specific examples thereof include fluorine resins such as polyvinylidene fluoride (hereinafter, referred to as PVDF in some cases), polytetrafluoroethylene (hereinafter, referred to as PTFE in some cases), ethylene tetrafluoride propylene hexafluoride vinylidene fluoride copolymer, propylene hexafluoride vinylidene fluoride copolymer and ethylene tetrafluoride perfluoro vinyl ether copolymer; and polyolefin resins such as polyethylene and polypropylene. Two or more of these compounds may be used in admixture. Further, an electrode mixture superior in adhesion property with an electrode current collector can be obtained by using a fluorine resin and a polyolefin resin as the binder, and containing them so that the proportion of the fluorine resin relative to the positive electrode mixture is from 1 to 10% by weight and the proportion of the polyolefin resin relative to the positive electrode mixture is from 0.1 to 2% by weight.

Electrode Current Collector

In case the electrode is used as a positive electrode in a secondary battery, Al, Ni, stainless steel and the like can be used as the electrode (positive electrode) current collector, and Al is preferable since it can be processed into a thin film easily and it is cheap.

Also, in case the electrode is used as a negative electrode, Cu, Ni, stainless steel and the like can be used as an electrode (negative electrode) current collector, Cu may be used since it hardly forms an alloy with lithium and is processed into a thin film easily.

Method for Production of Electrode

As the method for allowing an electrode mixture to be supported on an electrode current collector, there is mentioned a method of pressure molding or a method of pasting an electrode mixture using an organic solvent and the like, applying the paste on an electrode current collector, drying this, and then performing pressing and the like to attain fixation thereof. In the case of pasting, a slurry composed of an electrode active material, an electrically conductive material, a binder and an organic solvent is prepared. The organic solvent includes amine solvents such as N,N-dimethylaminopropylamine and diethylenetriamine; ether solvents such as ethylene oxide and tetrahydrofuran; ketone solvents such as methyl ethyl ketone; ester solvents such as methyl acetate; aprotic polar solvents such as dimethylacetamide and N-methyl-2-pyrrolidone; and the like. Examples of the method of applying an electrode mixture on an electrode current collector include, for example, a slit die coating method, a screen coating method, a curtain coating method, a knife coating method, a gravure coating method, an electrostatic spray method and the like.

Nonaqueous Electrolyte Secondary Battery

The nonaqueous electrolyte secondary battery of the present invention has the above-described electrode.

Description will be made below by way of a nonaqueous electrolyte secondary battery including the above-described electrode as a positive electrode, mainly.

A positive electrode, a separator, and a negative electrode in which a negative electrode mixture is supported on a negative electrode current collector are stacked in this order and wound to yield an electrode group, which is then accommodated in container such as a battery can, and then the electrode group is impregnated with an electrolytic solution composed of an organic solvent containing an electrolyte, and thus a nonaqueous electrolyte secondary battery including the electrode as a positive electrode can be produced.

Examples of the shape of the electrode group can include shapes revealing circle, ellipse, rectangle and rounded rectangle of cross section when the electrode group is cut in a direction perpendicular to the axis of winding thereof. Examples of the shape of the battery can include a shape such as a paper shape, a coin shape, a cylinder shape or an angular shape.

In case the electrode is used as the positive electrode, the negative electrode may be an electrode which can be doped and dedoped with lithium ions at potential lower than a positive electrode, and examples thereof can include electrodes in which a negative electrode mixture containing a negative electrode material is supported on a negative electrode current collector, or electrodes composed of a negative electrode material alone. The negative electrode material includes carbonaceous materials, chalcogen compounds (oxides, sulfides and the like), nitrides, metals or alloys, which can be doped and dedoped with lithium ions at potential lower than a positive electrode. These negative electrode materials may be mixed and used.

The negative electrode materials will be exemplified below. Examples of the carbonaceous materials can include graphites such as natural graphite and artificial graphite; cokes; carbon black; pyrolytic carbons; carbon fiber; and organic polymer compound calcined bodies. Examples of the oxide can include oxides of silicon represented by the formula $SiO_x$ (wherein, x represents a positive real number) such as $SiO_2$ and $SiO$; oxides of titanium represented by the formula $TiO_x$ (wherein, x represents a positive real number) such as $TiO_2$ and $TiO$; oxides of vanadium represented by the formula $VO_x$ (wherein, x represents a positive real number) such as $V_2O_5$ and $VO_2$; oxides of iron represented by the formula $FeO_x$ (wherein, x represents a positive real number) such as $Fe_3O_4$, $Fe_2O_3$ and $FeO$; oxides of tin represented by the formula $SnO_x$ (wherein, x represents a positive real number) such as $SnO_2$ and $SnO$; oxides of tungsten represented by the formula $WO_x$ (wherein, x represents a positive real number) such as $WO_3$ and $WO_2$; and mixed metal oxides containing lithium and titanium and/or vanadium, such as $Li_4Ti_5O_{12}$ and $LiVO_2$ (e.g., $Li_{1.1}V_{0.9}O_2$). Examples of the sulfide can include sulfides of titanium represented by the formula $TiS_x$ (wherein, x represents a positive real number) such as $Ti_2S_3$, $TiS_2$ and $TiS$; sulfides of vanadium represented by the formula $VS_x$ (wherein, x represents a positive real number) such as $V_3S_4$, $VS_2$ and $VS$; sulfides of iron represented by the formula $FeS_x$ (wherein, x represents a positive real number) such as $Fe_3S_4$, $FeS_2$ and $FeS$; sulfides of molybdenum represented by the formula $MoS_x$ (wherein, x represents a positive real number) such as $Mo_2S_3$ and $MoS_2$; sulfides of tin represented by the formula $SnS_x$ (wherein, x represents a positive real number) such as $SnS_2$ and SnS; sulfides of tungsten represented by the formula $WS_x$ (wherein, x represents a positive real number) such as $WS_2$; sulfides of antimony represented by the formula $SbS_x$ (wherein, x represents a positive real number) such as $Sb_2S_3$; and sulfides of selenium represented by the formula $SeS_x$ (wherein, x represents a positive real number) such as $Se_5S_3$, $SeS_2$ and SeS. Examples of the nitride can include lithium-containing nitrides such as $Li_3N$ and $Li_{3-x}A_xN$ (wherein, A represents Ni and/or Co, and 0<x<3). These carbonaceous materials, oxides, sulfides and nitrides may be used in combination, and may be either crystalline or amorphous. Further, these carbonaceous materials, oxides, sulfides and nitrides are, in most cases, supported on a negative electrode current collector, and used as an electrode.

Examples of the metal include lithium metals, silicon metals and tin metals. Examples of the alloy can include lithium alloys such as Li—Al, Li—Ni and Li—Si; silicon alloys such as Si—Zn; tin alloys such as Sn—Mn, Sn—Co, Sn—Ni, Sn—Cu and Sn—La; and additionally alloys such as $Cu_2Sb$ and $La_3Ni_2Sn_7$. These metals and alloys are, in most cases, used alone as an electrode (for example, used in the form of foil).

Among the negative electrode materials, carbonaceous materials composed of graphite such as natural graphite and artificial graphite as a main component are preferably used from the standpoint of high potential flatness, low average discharge potential, good cyclic performance and the like. As the shape of the carbonaceous material, for example, any of flake such as natural graphite, sphere such as mesocarbon microbeads, fiber such as graphitized carbon fiber, aggregate of fine powder and the like, may be used.

The negative electrode mixture may contain a binder, if necessary. The binder can include thermoplastic resins, and specific examples thereof can include PVDF, thermoplastic polyimide, carboxymethylcellulose, polyethylene, and polypropylene.

The negative electrode current collector can include Cu, Ni, stainless steel and the like, and from the standpoint of difficulty of making an alloy with lithium and easiness of processing into a thin film, Cu may be used. As the method for allowing a negative electrode mixture to be supported on the negative electrode current collector, there are mentioned a method of pressure molding, a method of pasting a negative electrode mixture using a solvent and the like, and applying this on a negative electrode current collector and drying this, and then performing pressing to attain press bonding thereof, and the like, similar to the above case.

As the separator, for example, there can be used members having a form of a porous membrane, a non-woven fabric, a woven fabric or the like, which is made of a material such as a polyolefin resin, e.g., polyethylene and polypropylene, a fluorine resin, and nitrogen-containing aromatic polymer, and moreover, two or more of the above materials may be used to give a separator, or, the above members may be laminated. As the separator, separators described in, for example, JP-A-2000-30686 and JP-A-10-324758 can be mentioned. It is advantageous that the thickness of the separator is thinner providing that mechanical strength is maintained, from the standpoint of increase in the volumic energy density of a battery and decrease in internal resistance thereof, and it is usually from about 5 to 200 μm, and preferably from about 5 to 40 μm. The separator has air permeability according to the Gurley method of preferably from 50 to 300 sec/100 cc, further preferably from 50 to 200 sec/100 cc, from the standpoint of combination with ion permeability. The separator has a porosity of usually from 30 to 80% by volume, preferably from 40 to 70% by volume. The separator may also be a laminate of separators having different porosities.

The separator preferably has a porous film containing a thermoplastic resin. The nonaqueous electrolyte secondary battery preferably has a function by which, when an abnormal current flows in the battery usually because of short circuit between a positive electrode and a negative electrode and the like, the current is interrupted to block (shutdown) the flow of excessive current. Here, shutdown is carried out by obstructing micropores of a porous film of a separator, in the case of surpassing usual use temperature. It is preferable that after clogging of pores of a separator, even if the temperature in the battery increases to a certain high temperature, membrane destruction of a separator should not occur at this temperature and a state of clogging of pores of a separator be maintained. As this separator, for example, a laminate film in which a heat resistant porous layer and a porous film are stacked each other is mentioned, and it becomes possible to further increase the heat resistance of a secondary battery by using this film as a separator. Here, the heat resistant porous layer may be stacked on both surfaces of the porous film.

The laminate film in which a heat resistant porous layer and a porous film are stacked each other will be described in more detail below.

In the laminate film, the heat resistant porous layer is a layer having higher heat resistance than the porous film, and the heat resistant porous layer may be formed from an inorganic powder, or may contain a heat resistant resin. Since the heat resistant porous layer contains a heat resistant resin, the heat resistant porous layer can be formed by an easy method such as coating. The heat resistant resin can include polyamide, polyimide, polyamideimide, polycarbonate, polyacetal, polysulfone, polyphenylene sulfide, polyether ketone, aromatic polyester, polyether sulfone and polyether imide, preferable heat resistant resin are polyamide, polyimide, polyamideimide, polyether sulfone and polyether imide, and more preferable heat resistant resin are polyamide, polyimide and polyamideimide. Further more preferable heat resistant resin are nitrogen-containing aromatic polymers such as aromatic polyamide (para-oriented aromatic polyamide, meta-oriented aromatic polyamide), aromatic polyimide and aromatic polyamideimide, particularly preferable heat resistant resin is aromatic polyamide, and from the standpoint of ease of use, most preferable heat resistant resin is para-oriented aromatic polyamide (hereinafter, referred to as "para-aramide" in some cases). The heat resistant resin can include also poly-4-methylpentene-1 and cyclic olefin polymers. By using these heat resistant resins, the heat resistance of a laminate film, that is, the thermal membrane destruction temperature of a laminate film can be further enhanced. In the case of use of a nitrogen-containing aromatic polymer among these heat resistant resins, compatibility with an electrolytic solution, namely, a liquid retaining property on a heat resistant porous layer may also increase, possibly due to polarity in its molecule, and also the rate of impregnation of an electrolytic solution in production of a nonaqueous electrolyte secondary battery is high, and also the charge and discharge capacity of a nonaqueous electrolyte secondary battery further increases.

The thermal membrane destruction temperature of such a laminate film depends on the kind of a heat resistant resin, and is selected and used according to the use stage and use object. More specifically, the thermal membrane destruction temperature can be controlled to about 400° C. in the case of use of the nitrogen-containing aromatic polymer, to about 250° C. in the case of use of poly-4-methylpentene-1 and to about 300° C. in the case of use of a cyclic olefin polymer, as the heat resistant resin, respectively. When the heat resistant porous layer is composed of an inorganic powder, it is also possible to control the thermal membrane destruction temperature to, for example, 500° C. or higher.

The para-aramide is obtained by condensation polymerization of a para-oriented aromatic diamine and a para-oriented aromatic dicarboxylic halide, and consists substantially of a repeating unit in which an amide bond is linked at a para-position of an aromatic ring or orientation position analogous thereto (for example, orientation position extending coaxially or parallel toward the reverse direction, such as 4,4'-biphenylene, 1,5-naphthalene, and 2,6-naphthalene). Specific examples thereof include para-aramides having a para-orientation type structure or a structure according to the para-orientation type, such as poly(para-phenyleneterephthalamide), poly(para-benzamide), poly(4,4'-benzanilide terephthalamide), poly(para-phenylene-4,4'-biphenylene dicarboxylic amide), poly(para-phenylene-2,6-naphthalene dicarboxylic amide), poly(2-chloro-para-phenyleneterephthalamide) and para-phenyleneterephthalamide/2,6-dichloro para-phenyleneterephthalamide copolymer.

As the aromatic polyimide, preferable are wholly aromatic polyimides produced by polycondensation of an aromatic dianhydride and a diamine. Specific examples of the dianhydride include pyromellitic dianhydride, 3,3',4,4'-diphenylsulfone tetracarboxylic dianhydride, 3,3',4,4'-benzophenone tetracarboxylic dianhydride, 2,2'-bis(3,4-dicarboxyphenyl) hexafluoropropane and 3,3',4,4'-biphenyl tetracarboxylic dianhydride. Specific examples of the diamine include oxydianiline, para-phenylenediamine, benzophenonediamine, 3,3'-methylenedianiline, 3,3'-diaminobenzophenone, 3,3'-diaminodiphenylsulfone and 1,5'-naphthalenediamine. Further, solvent-soluble polyimides can be suitably used. Examples of such a polyimide include a polyimide which is a polycondensate of 3,3',4,4'-diphenylsulfone tetracarboxylic dianhydride and an aromatic diamine.

The aromatic polyamideimide includes those obtained by condensation polymerization of an aromatic dicarboxylic acid and an aromatic diisocyanate, and those obtained by condensation polymerization of an aromatic dianhydride and an aromatic diisocyanate. Specific examples of the aromatic dicarboxylic acid include isophthalic acid, terephthalic acid and the like. Specific examples of the aromatic dianhydride include trimellitic anhydride and the like. Specific examples of the aromatic diisocyanate include 4,4'-diphenylmethane diisocyanate, 2,4-tolylene diisocyanate, 2,6-tolylene diisocyanate, ortho-tolylane diisocyanate, m-xylene diisocyanate and the like.

For further enhancing ion permeability, it is preferable that the thickness of the heat resistant porous layer be thinner, and the thickness is preferably 1 μm or more and 10 μm or less, further preferably 1 μm or more and 5 μm or less, and particularly preferably 1 μm or more and 4 μm or less. The heat resistant porous layer has micropores, and the pore size (diameter) is usually 3 μm or less, preferably 1 μm or less.

When the heat resistant porous layer contains a heat resistant resin, the heat resistant porous layer may further contain fillers. The material of the filler may be selected from any of an organic powder, an inorganic powder or a mixture thereof. Particles constituting the filler preferably have an average particle diameter of 0.01 μm or more and 1 μm or less.

The organic powder includes powders made of organic substances such as styrene, vinyl ketone, acrylonitrile, methyl methacrylate, ethyl methacrylate, glycidyl methacrylate, glycidyl acrylate and methyl acrylate alone or a copolymer composed of two or more of these compounds; fluorine-containing resins such as polytetrafluoroethylene, ethylene tetrafluoride-propylene hexafluoride copolymer, ethylene tetrafluoride-ethylene copolymer and polyvinylidene fluoride; melamine resins; urea resins; polyolefins; polymethacrylate. These organic powders may be used singly, or in admixture of two or more. Among these organic powders, a polytetrafluoroethylene powder is preferable from the standpoint of chemical stability.

As the inorganic powder, powders composed of inorganic substances such as, for example, metal oxides, metal nitrides, metal carbides, metal hydroxides, carbonates and sulfates are mentioned and, among of them, powders composed of inorganic substances of low electric conductivity are preferably used. Specific examples thereof include powders composed of alumina, silica, titanium dioxide, and calcium carbonate. These inorganic powders may be used singly or in admixture of two or more. Among these inorganic powders, an alumina powder is preferable from the standpoint of chemical stability. Here, it is more preferable that all particles constituting the filler be alumina particles, and further more preferable is an embodiment in which all particles constituting the filler are alumina particles and a part of or all of them are approximately spherical alumina particles. When the heat resistant porous layer is formed from an inorganic powder, the above-exemplified inorganic powders may be used, and if necessary, a binder may be mixed with them.

The content of a filler when the heat resistant porous layer contains a heat resistant resin depends on the specific gravity of the material of the filler, and for example, the weight of the filler is usually 5 or more and 95 or less, preferably 20 or more and 95 or less, and more preferably 30 or more and 90 or less, the total weight of the heat resistant porous layer being 100. These ranges are particularly preferred in case when all particles constituting the filler are alumina particles.

The shape of the filler includes an approximately spherical shape, a plate shape, a column shape, a needle shape, a whisker shape, a fiber shape and the like, and any particles can be used, and preferable are approximately spherical particles since uniform pores are formed easily with them. The approximately spherical particles include particles having a particle aspect ratio (particle major axis/particle minor axis) within a range of 1 or more and 1.5 or less. The particle aspect ratio can be measured by an electron micrograph.

In the laminate film, the porous film has micropores, and usually has a shutdown function. The porous film usually has a micropore size (diameter) of usually 3 μm or less, preferably 1 μm or less. The porous film has porosity of usually from 30 to 80% by volume, preferably from 40 to 70% by volume. In the nonaqueous electrolyte secondary battery, in the case of surpassing the usual use temperature, the porous film can be deformed and softened by a shutdown function to clog micropores thereof.

In the laminate film, as the resin constituting a porous film, those which are not dissolved in an electrolytic solution of a nonaqueous electrolyte secondary battery may be selected. Specific examples thereof can include polyolefin resins such as polyethylene and polypropylene, and thermoplastic polyurethane resins, and a mixture of two or more of these compounds may also be used. For softening at lower temperature to attain shutdown, a porous film preferably contains a polyefin resin, and more preferably polyethylene. Specific examples of the polyethylene can include polyethylenes such as low density polyethylene, high density polyethylene and linear polyethylene, and ultrahigh molecular weight polyethylenes are also mentioned. For further enhancing the puncture strength of a porous film, it is preferable that the resin constituting the film contain at least an ultrahigh molecular weight polyethylene. From the standpoint of production of a porous film, it is preferable in some cases that the resin contain a wax composed of a polyolefin of low molecular weight (weight average molecular weight of 10,000 or less).

The thickness of a porous film in a laminate film is usually from 3 to 30 µm, and preferably from 3 to 25 µm. The thickness of a laminate film is usually 40 µm or less, and preferably 20 µm or less. It is preferable that the value of A/B be 0.1 or more and 1 or less, where the thickness of a heat resistant porous layer being A (µm) and the thickness of a porous film is B (µm).

An example of production for the laminate film will be described below.

First, a method of producing the porous film will be described. The production of the porous film is not particularly limited, and examples of the production method include a method in which film molding is carried out by adding a plasticizer to a thermoplastic resin and the plasticizer is then removed using a suitable solvent, as described in JP-A-07-29563, and a method in which a film composed of a thermoplastic resin produced by a known method is used and then an amorphous portion of the film that is structurally weak is selectively drawn to form micropores, as described in JP-A-07-304110. For example, when the porous film is formed from a polyolefin resin containing an ultrahigh molecular weight polyethylene and a low molecular weight polyolefin having a weight average molecular weight of 10,000 or less, it is preferable to produce the porous film by a method shown below in terms of production cost. That is, the method including:

(1) a step of kneading 100 parts by weight of an ultrahigh molecular weight polyethylene, 5 to 200 parts by weight of a low molecular weight polyolefin having a weight average molecular weight of 10,000 or less, and 100 to 400 parts by weight of an inorganic filler to yield a polyolefin resin composition, (2) a step of molding a sheet using the polyolefin resin composition, (3) a step of removing the inorganic filler from the sheet yielded in the step (2), and (4) a step of drawing the sheet yielded in the step (3) to produce the porous film, or a method including:

(1) a step of kneading 100 parts by weight of an ultrahigh molecular weight polyethylene, 5 to 200 parts by weight of a low molecular weight polyolefin having a weight average molecular weight of 10,000 or less, and 100 to 400 parts by weight of an inorganic filler to yield a polyolefin resin composition, (2) a step of molding a sheet using the polyolefin resin composition, (3) a step of drawing the sheet yielded in the step (2), and (4) a step of removing the inorganic filler from the drawn sheet yielded in the step (3) to produce the porous film.

In terms of strength and ion permeability of the porous film, the inorganic filler to be used has an average particle size (diameter) of preferably 0.5 µm or less, and further preferably 0.2 µm or less. Herein, the value measured from an electron micrograph is used as the average particle diameter. Specifically, 50 particles are arbitrarily extracted from inorganic filler particles in the micrograph, and then particle sizes of the individual particles are measured, and the average value thereof is used as the average particle diameter.

Examples of the inorganic filler include calcium carbonate, magnesium carbonate, barium carbonate, zinc oxide, calcium oxide, aluminum hydroxide, magnesium hydroxide, calcium hydroxide, calcium sulfate, silicic acid, zinc oxide, calcium chloride, sodium chloride, and magnesium sulfate. These inorganic fillers can be removed from a sheet or a film using an acid or alkaline solution. In terms of controllability of particle sizes and selective solubility in acid, it is preferable to use calcium carbonate.

A method of producing the polyolefin resin composition is not particularly limited. Materials constituting the polyolefin resin composition such as a polyolefin resin, and an inorganic filler are mixed using mixers such as a roll, a Banbury mixer, a single-screw extruder, and a twin-screw extruder to yield the polyolefin resin composition. When the materials are mixed, fatty acid esters and additives such as a stabilizing agent, an antioxidant, an ultraviolet absorber, and a flame-retardant may also be added on an as needed basis.

A method of producing the sheet composed of the polyolefin resin composition is not particularly limited, and the sheet can be produced by sheet molding methods such as inflation processing, calendering processing, T-die extrusion processing, and a skife method. Since a sheet having higher film thickness accuracy is obtainable, it is preferable to produce the sheet by the following method.

The preferable method of producing the sheet composed of the polyolefin resin composition is a method in which a polyolefin resin composition is roll-molded by using a pair of rotational molding tools having a surface temperature adjusted to be higher than the melting point of a polyolefin resin contained in the polyolefin resin composition. The surface temperature of the rotational molding tools is preferably (melting point+5)° C. or higher. The upper limit of the surface temperature is preferably (melting point+30)° C. or lower, and further preferably (melting point+20)° C. or lower. Examples of the pair of rotational molding tools include a roll and a belt. The circumferential velocities of both of the rotational molding tools are not necessarily strictly the same circumferential velocity, and it is sufficient as long as the difference between the circumferential velocities thereof is within about ±5%. The porous film is produced by using the sheet obtained by such method, whereby the porous film superior in strength, ion permeability, air permeability, and the like can be obtained. In addition, a sheet obtained by laminating single-layered sheets obtained by the above-described method may be used in the production of the porous film.

When the polyolefin resin composition is roll-molded by the pair of rotational molding tools, a polyolefin resin composition discharged from an extruder in strand form may be introduced directly between the pair of rotational molding tools, and a polyolefin resin composition that has been temporarily formed into pellets may also be used.

When the sheet composed of the polyolefin resin composition or the sheet in which the inorganic filler is removed is drawn, a tenter, a roll, an autograph or the like can be used. In terms of the air permeability, a draw ratio is preferably 2 to 12 times, and more preferably 4 to 10 times. Drawing is carried out at a drawing temperature of usually not less than the softening point of the polyolefin resin and not more than the melting point thereof, and is preferably carried out at a drawing temperature of 80 to 115° C. When the drawing temperature is too low, film rupture tends to occur during the drawing, while when the drawing temperature is too high, the air permeability and the ion permeability of a resultant porous film are lowered in some cases. After the drawing is carried out, it is preferable to perform heat setting. A heat setting temperature is preferably lower than the melting point of the polyolefin resin.

The porous film containing the thermoplastic resin obtained by the above-described method and the heat resistant porous layer are stacked each other to yield a laminate film. The heat resistant porous layer may be provided on one surface or both surfaces of the porous film.

Examples of a method of stacking the porous film and the heat resistant porous layer each other include a method in which the heat resistant porous layer and the porous film are separately produced and then stacked each other, and a method in which a coating liquid containing a heat resistant resin and a filler is applied on at least one surface of the porous film to form the heat resistant porous layer. When the heat resistant porous layer is relatively thin, the latter method is preferable in terms of productivity. A specific example of the method in which a coating liquid containing a heat resistant resin and a filler is applied on at least one surface of the porous film to form a heat resistant resin layer includes a method including the following steps.

(a) A slurry-form coating liquid is prepared in which 1 to 1,500 parts by weight of a filler relative to 100 parts by weight of a heat resistant resin is dispersed in a polar organic solvent solution containing 100 parts by weight of the heat resistant resin.

(b) The coating liquid is applied on at least one surface of the porous film to form a coating membrane.

(c) The heat resistant resin is deposited from the coating membrane by a means such as moistening, solvent removal, or immersion in a solvent that does not dissolve the heat resistant resin, and is then dried on an as needed basis.

The coating liquid is preferably applied continuously by employing a coating apparatus described in JP-A-2001-316006 and a method described in JP-A-2001-23602.

When the heat resistant resin in the polar organic solvent solution is the para-aramide, a polar amide solvent or a polar urea solvent can be used as a polar organic solvent. Specific examples thereof include, but are not limited to, N,N-dimethylformamide, N,N-dimethylacetamide, N-methyl-2-pyrrolidone (NMP), tetramethylurea and the like.

In case of using the para-aramide as the heat resistant resin, for the purpose of improving the solubility of the para-aramide in solvent, it is preferable to add chlorides of alkali metals or alkali earth metals when para-aramide polymerization is carried out. Specific examples thereof include, but are not limited to, lithium chloride and calcium chloride. The amount of the chloride to be added to the polymerization system is preferably within a range from 0.5 to 6.0 mol per 1.0 mol of an amide group generated by condensation polymerization, and more preferably within a range from 1.0 to 4.0 mol. When the chloride is less than 0.5 mol, the solubility of the para-aramide to be generated is not sufficient in some cases. The case where the chloride is more than 6.0 mol is not preferable in some cases because the solubility of the chloride in the solvent is substantially exceeded. In general, when the chloride of the alkali metal or alkali earth metal is less than 2% by weight, the solubility of the para-aramide is insufficient in some cases and, when the chloride is more than 10% by weight, the chloride of the alkali metal or alkali earth metal is not dissolved in polar organic solvents such as the polar amide solvent, or the polar urea solvent in some cases.

When the heat resistant resin is an aromatic polyimide, as polar organic solvents that dissolve the aromatic polyimide, dimethyl sulfoxide, cresol, o-chlorophenol and the like can be suitably used in addition to those exemplifying solvents that dissolve the aramide.

A method of yielding the slurry-form coating liquid by dispersing the filler includes a method using apparatuses such as pressure dispersion machines (Gaulin homogenizer, nanomizer).

Examples of a method of coating the slurry-form coating liquid include coating methods such as a knife, blade, bar, gravure, and die. Coating methods using the bar, knife and the like are simple. The die coating, which has a configuration in which a solution does not come into contact with outside air, is preferable from industrial point of view. There are cases where the coating is carried out twice or more. In this case, the coating is usually carried out after the heat resistant resin is deposited in the step (c).

In the above-described case where the heat resistant porous layer and the porous film are separately produced and then stacked, it is advantageous to fix them by methods using an adhesive, thermal fusion, and the like.

In a secondary battery, the electrolytic solution is usually composed of an organic solvent containing an electrolyte. The electrolyte includes lithium salts such as $LiClO_4$, $LiPF_6$, $LiAsF_6$, $LiSbF_6$, $LIBF_4$, $LiCF_3SO_3$, $LiN(SO_2CF_3)_2$, $LiC(SO_2CF_3)_3$, $Li_2B_{10}Cl_{10}$, lower aliphatic carboxylic acid lithium salts and $LiAlCl_4$, and a mixture of two or more of these compounds may also be used. Usually, at least one compound selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$ containing fluorine, among the above-mentioned salts, is used as the lithium salt.

In the a electrolytic solution, it is possible to use, as the organic solvent, for example, carbonates such as propylene carbonate, ethylene carbonate, dimethyl carbonate, diethyl carbonate, ethyl methyl carbonate, 4-trifluoromethyl-1,3-dioxolan-2-one and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran and 2-methyltetrahydrofuran; esters such as methyl formate, methyl acetate and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide and 1,3-propane sultone, or compounds obtained by further introducing a fluorine substituent into the organic solvents, and usually, two or more of these solvents are used in admixture. Among them, preferable are mixed solvents containing carbonates, and further preferable are mixed solvents of cyclic carbonates and non-cyclic carbonates or mixed solvents of cyclic carbonates and ethers. As the mixed solvents of cyclic carbonates and non-cyclic carbonates, preferable are mixed solvents containing ethylene carbonate, dimethyl carbonate and ethyl methyl carbonate since the operational temperature range is wide, a load property is excellent, and difficult degradability is secured even if a graphite material such as natural graphite and artificial graphite is used as the negative electrode active material. An electrolyte solution, which contains lithium salts containing fluorine such as $LiPF_6$ and organic solvents having a fluorine substituent, is preferably used since a particularly excellent safety improving effect is obtained. Mixed solvents containing ethers and dimethyl carbonate having a fluorine substituent such as pentafluoropropyl methyl ether and 2,2,3,3-tetrafluoropropyl difluoromethyl ether are further preferable since these are excellent also in a large current discharge property.

Instead of the electrolytic solution, a solid electrolyte may be used. As the solid electrolyte, for example, organic polymer electrolytes such as polyethylene oxide type polymer compounds and polymer compounds containing at least one kind of a polyorganosiloxane chain or polyoxyalkylene chain can be used. Further, so-called gel type electrolytes obtained by allowing a non-aqueous electrolyte solution to be supported on a polymer compound can also be used. Moreover, inorganic solid electrolytes containing a sulfide such as $Li_2S$—$SiS_2$, $Li_2S$—$GeS_2$, $Li_2S$—$P_2S_5$, $Li_2S$—$B_2S_3$, $Li_2S$—$SiS_2$—$Li_3PO_4$ and $Li_2S$—$SiS_2$—$Li_2SO_4$ may also be used. Using these solid electrolytes, safety can be further enhanced. In the nonaqueous electrolyte secondary battery of the present invention, when a solid electrolyte is used, the solid electrolyte plays a role of separator in some cases. In these cases, a separator is not necessary in some cases.

EXAMPLES

The present invention will be described in more detail by way of Examples. Unless otherwise specified, a method for evaluation of a lithium mixed metal oxide, and a method for production and evaluation of an electrode and nonaqueous electrolyte secondary battery are as follows.
(1) Production of Electrode To a mixture of an electrode active material (lithium mixed metal oxide) and an electrically conductive material (mixture of acetylene black and graphite of 9:1), an N-methyl-2-pyrrolidone (NMP, manufactured by Tokyo Chemical Industry Co., Ltd.) solution of polyvinylidene difluoride polyflon (PVDF, manufactured by KUREHA CORPORATION) as a binder was added so as to give a composition of active material:electrically conductive material:binder=87:10:3 (ratio by weight) and the resultant mixture was kneaded to yield a paste, and the paste was applied on an Al foil having a thickness of 40 μm as a current collector, and then dried at 60° C. for 2 hours to yield an electrode sheet. Next, using a roll press, the electrode sheet was rolled under a pressure of 0.5 MPa and pieces having a size of 14.5 mmϕ were obtained by punching out using a punch, and then vacuum drying at 150° C. was performed for 8 hours to yield an electrode.
(2) Production of Nonaqueous Electrolyte Secondary Battery The electrode obtained in (1) was used as a positive electrode. The positive electrode was placed in a recess of the lower-side part of a coin cell (manufactured by Hohsen Corporation) by arranging an aluminum foil to face downward and a separator (polypropylene porous film (thickness: 20 μm)) was placed thereon, and then an electrolyte solution (a solution (hereinafter, referred to as $LiPF_6$/EC+DMC+EMC in some cases) prepared by dissolving $LiPF_6$ in a concentration of 1 mol/liter into a mixed solution of ethylene carbonate (hereinafter, referred to as EC in some cases), dimethyl carbonate (hereinafter, referred to as DMC in some cases) and ethyl methyl carbonate (hereinafter, referred to as EMC in some cases) in a ratio of 30:35:35 (ratio by volume)) was injected. Using a negative electrode (metal lithium), the metal lithium was combined with an inner lid and they were placed on the upper side of the separator by arranging the metal lithium to face downward, covered with an upper-side part via a gasket, and caulked by a caulking machine to produce a nonaqueous electrolyte secondary battery (coin-shaped battery R2032). The assembly of the battery was carried out in a glove box under an argon atmosphere.
(3) Evaluation of Nonaqueous Electrolyte Secondary Battery Using the nonaqueous electrolyte secondary battery obtained in (2), a discharge rate test shown below was carried out while maintaining at 25° C. In the discharge rate test, the discharge capacity was measured while changing the discharge current during discharging, and the discharge capacity retention was calculated.
<Discharge Rate Test>

Charge maximum voltage: 4.3 V, Charge time: 8 hours, Charge current: 0.2 mA/cm²

During discharging, the discharge minimum voltage was adjusted to a constant level of 3.0 V, and under such conditions, discharge was carried out while changing the discharge current in each cycle as described below. Higher discharge capacity by discharge at 100 (high current rate) means higher power output.

Discharge at 1st and 2nd cycles (0.2C): discharge current 0.2 mA/cm²
Discharge at 3rd cycle (1C): discharge current 1.0 mA/cm²
Discharge at 4th cycle (5C): discharge current 5.0 mA/cm²
Discharge at 5th cycle (10C): discharge current 10 mA/cm²
<Discharge Capacity Retention>

Discharge capacity retention (%)=(discharge capacity at each cycle (each rate))/(initial discharge capacity (discharge capacity at 1st cycle))×100
(4) Evaluation of Lithium Mixed Metal Oxide
1. Measurement of BET Specific Surface Area One gram of a powder was dried in a nitrogen atmosphere at 150° C. for 15 minutes, and then the BET specific surface area was measured using FlowSorb II 2300 manufactured by Micrometrics.
2. SEM Observation Particles constituting a powder were placed on an electrically conductive sheet pasted onto a sample stage, and irradiated with electron beams having an acceleration voltage of 20 kV using JSM-5510 manufactured by JEOL Ltd., and under such conditions, SEM observation was carried out. The diameter of primary particles and the average diameter of aggregated particles were determined.
3. Composition Analysis A powder was dissolved in hydrochloric acid, and then the composition was determined using an inductively coupled plasma atomic emission spectroscopy (SPS3000, hereinafter, referred to as ICP-AES in some cases).
4. Powder X-Ray Diffractometry Powder X-ray diffractometry of a lithium mixed metal oxide was carried out using RINT 2500 TTR-type manufactured by Rigaku Corporation. A lithium mixed metal oxide was filled on a dedicated substrate, and then the measurement was carried out in the range of diffraction angle 2θ=10° to 90° using a CuKα radiation source, to obtain a powder X-ray diffraction pattern.

Production Example 1

1. Production of First Lithium Mixed Metal Oxide

In a polypropylene beaker, 83.88 g of potassium hydroxide was added to 200 ml of distilled water and dissolved while stirring and then potassium hydroxide was completely dissolved to prepare an aqueous potassium hydroxide solution (aqueous alkali solution). In a glass beaker, 16.04 g of nickel (II) chloride hexahydrate, 13.36 g of manganese(II) chloride tetrahydrate and 2.982 g of iron(II) chloride tetrahydrate were added to 200 ml of distilled water, and dissolved while stirring to yield an aqueous nickel-manganese-iron mixed solution. While stirring the aqueous potassium hydroxide solution, the aqueous nickel-manganese-iron mixed solution was added dropwise thereto to generate a coprecipitate, and thus a coprecipitate slurry was obtained.

Next, the coprecipitate slurry was filtered, washed with distilled water and then dried at 100° C. to recover a coprecipitate. Using an agate mortar, 2.0 g of the coprecipitate, 1.16 g of lithium hydroxide monohydrate and 1.16 g of KCl were dry mixed to yield a mixture. Next, the mixture was charged in an alumina calcination container, calcinated by maintaining in an air atmosphere at 800° C. for 6 hours using an electric furnace and then cooled to room temperature to obtain a calcinated article. The calcinated article was pulverized, washed with distilled water by decantation, filtered and then dried at 100° C. for 8 hours to yield a powdery lithium mixed metal oxide $R_1$.

$R_1$ had a BET specific surface area of 7.8 m$^2$/g, and in SEM observation, the diameter of primary particles was 0.2 μm and the average diameter of aggregated particles formed by aggregating primary particles was 0.5 μm. As a result of the composition analysis, it was found that a molar ratio of Li:Ni:Mn:Fe is 1.10:0.45:0.45:0.10. As a result of the measurement of powder X-ray diffraction, the crystal structure belongs to the R-3m space group.

Comparative Example 1

1. Production of Second Lithium Mixed Metal Oxide

After weighing 6.16 kg of lithium hydroxide monohydrate and 13.8 kg of nickel cobalt mixed hydroxide $Ni_{0.85}Co_{0.15}(OH)_2$, respectively, they were mixed by Loedige Mixer (Model FM-130D, manufactured by MATSUBO Corporation) to yield a mixture. Next, the mixture was filled into an alumina sheath and calcined in an oxygen air flow at 750° C. for 10 hours to yield a powdery lithium mixed metal oxide (core material $C_1$). A powder obtained by mixing 10 kg of the resultant core material $C_1$ with 0.31 kg of aluminum oxide (assumed that the contents of Ni and Co in a core material $C_1$ is 1 mol, the content of Al is 0.06 mol) using Loedige Mixer (Model FM-130D, manufactured by MATSUBO Corporation) was subjected to a thermal treatment in an oxygen gas flow at 750° C. for 1.2 hours to yield a powdery lithium mixed metal oxide $R_2$ in which a surface of particles of the core material $C_1$ is coated with an aluminum compound.

$R_2$ had a BET specific surface area of 0.3 m$^2$/g, and in SEM observation, the diameter of primary particles was 0.5 μm and the average diameter of aggregated particles formed by aggregating primary particles was 10 μm. As a result of the bulk composition analysis, it was found that a molar ratio of Li:Ni:Co:Al is 1.03:0.85:0.15:0.06. As a result of the measurement of powder X-ray diffraction, the crystal structure belongs to the R-3m space group.

2. Discharge Rate Test of Nonaqueous Electrolyte Secondary Battery

Using $R_2$, a nonaqueous electrolyte secondary battery was produced and a discharge rate test was carried out to find that the discharge capacities (mAh/g) at 0.2C, 1C, 5C and 10C were 186, 175, 159 and 107, respectively, and the discharge capacity retentions (%) thereof were 100, 94, 85 and 58, respectively. The results of a discharge capacity retention of a discharge capacity at 10C to an initial discharge capacity at 0.2C are shown in Table 1.

Example 1

1. Preparation of Electrode Active Material

After weighing 1.2 g of $R_1$ and 2.8 g of $R_2$ (43 parts by weight of $R_1$ relative to 100 parts by weight of $R_2$), respectively, they were sufficiently mixed by an agate mortar to yield an electrode active material $A_1$.

2. Discharge Rate Test of Nonaqueous Electrolyte Secondary Battery

Using $A_1$, a nonaqueous electrolyte secondary battery was produced and a discharge rate test was carried out to find that the discharge capacities (mAh/g) at 0.2C, 1C, 5C and 10C were 165, 154, 142 and 135, respectively, and the discharge capacity retentions (%) thereof were 100, 98, 86 and 82, respectively, and the discharge capacity at 10C and the discharge capacity retention were very high. The results of a discharge capacity retention of a discharge capacity at 10C to an initial discharge capacity at 0.2C are shown in Table 1.

Example 2

1. Preparation of Electrode Active Material

After weighing 2.0 g of $R_1$ and 2.0 g of $R_2$ (100 parts by weight of $R_1$ relative to 100 parts by weight of $R_2$), respectively, they were sufficiently mixed by an agate mortar to yield an electrode active material $A_2$.

2. Discharge Rate Test of Nonaqueous Electrolyte Secondary Battery

Using $A_2$, a nonaqueous electrolyte secondary battery was produced and a discharge rate test was carried out to find that the discharge capacities (mAh/g) at 0.2C, 1C, 5C and 10C were 151, 141, 127 and 119, respectively, and the capacity retentions (%) thereof were 100, 93, 84 and 79, respectively, and the discharge capacity at 10C and the discharge capacity retention were very high. The results of a discharge capacity retention of a discharge capacity at 10C to an initial discharge capacity at 0.2C are shown in Table 1.

Example 3

1. Preparation of Electrode Active Material

After weighing 2.8 g of $R_1$ and 1.2 g of $R_2$ (233 parts by weight of $R_1$ relative to 100 parts by weight of $R_2$), respectively, they were sufficiently mixed by an agate mortar to yield an electrode active material $A_3$.

2. Discharge Rate Test of Nonaqueous Electrolyte Secondary Battery

Using $A_3$, a nonaqueous electrolyte secondary battery was produced and a discharge rate test was carried out to find that the discharge capacities (mAh/g) at 0.2C, 1C, 5C and 10C were 134, 125, 110 and 103, respectively, and the capacity retentions (%) thereof were 100, 93, 82 and 77, respectively, and the discharge capacity at 10C and the discharge capacity retention were very high. The results of a discharge capacity retention of a discharge capacity at 10C to an initial discharge capacity at 0.2C are shown in Table 1.

Example 4

1. Preparation of Electrode Active Material

After weighing 3.6 g of $R_1$ and 0.4 g of $R_2$ (900 parts by weight of $R_1$ relative to 100 parts by weight of $R_2$), respectively, they were sufficiently mixed by an agate mortar to yield an electrode active material $A_4$.

2. Discharge Rate Test of Nonaqueous Electrolyte Secondary Battery

Using $A_3$, a nonaqueous electrolyte secondary battery was produced and a discharge rate test was carried out to find that the discharge capacities (mAh/g) at 0.2C, 1C, 5C and 10C were 124, 115, 101 and 93, respectively, and the discharge capacity retentions (%) thereof were 100, 93, 81 and 75, respectively, and the discharge capacity at 10C and the discharge capacity retention were very high. The results of a discharge capacity retention of a discharge capacity at 10C to an initial discharge capacity at 0.2C are shown in Table 1.

Example 5

1. Preparation of Electrode Active Material

After weighing 0.4 g of $R_1$ and 3.6 g of $R_2$ (11 parts by weight of $R_1$ relative to 100 parts by weight of $R_2$), respectively, they were sufficiently mixed by an agate mortar to yield an electrode active material $A_5$.

2. Discharge Rate Test of Nonaqueous Electrolyte Secondary Battery

Using $A_5$, a nonaqueous electrolyte secondary battery was produced and a discharge rate test was carried out to find that the discharge capacities (mAh/g) at 0.2C, 1C, 5C and 10C were 174, 163, 151 and 130, respectively, and the discharge capacity retentions (%) thereof were 100, 94, 87 and 75, respectively, and the discharge capacity at 10C and the discharge capacity retention were very high. The results of a discharge capacity retention of a discharge capacity at 10C to an initial discharge capacity at 0.2C are shown in Table 1.

Example 6

1. Preparation of Electrode Active Material

After weighing 0.8 g of $R_1$ and 3.2 g of $R_2$ (25 parts by weight of $R_1$ relative to 100 parts by weight of $R_2$), respectively, they were sufficiently mixed by an agate mortar to yield an electrode active material $A_6$.

2. Discharge Rate Test of Nonaqueous Electrolyte Secondary Battery

Using $A_6$, a nonaqueous electrolyte secondary battery was produced and a discharge rate test was carried out to find that the discharge capacities (mAh/g) at 0.2C, 1C, 5C and 100 were 162, 152, 139 and 128, respectively, and the discharge capacity retentions (%) thereof were 100, 94, 86 and 79, respectively, and the discharge capacity at 10C and the discharge capacity retention were very high. The results of a discharge capacity retention of a discharge capacity at 10C to an initial discharge capacity at 0.2C are shown in Table 1.

Comparative Example 2

1. Production of First Lithium Mixed Metal Oxide

The coprecipitate (2.0 g) obtained in Production Example 1, 1.16 g of lithium hydroxide monohydrate and 1.16 g of KCl were dry mixed using an agate mortar to yield a mixture. Next, the mixture was charged in an alumina calcination container, calcinated by maintaining in an air atmosphere at 1,000° C. for 4 hours using an electric furnace and then cooled to room temperature to yield a calcinated article. The calcinated article was pulverized, washed with distilled water by decantation, filtered and then dried at 100° C. for 8 hours to yield a powdery lithium mixed metal oxide $R_3$.

$R_3$ had a BET specific surface area of 2.3 m$^2$/g, and in SEM observation, the diameter of primary particles was 1.5 μm and the average diameter of aggregated particles formed by aggregating primary particles was 20 μm. As a result of the composition analysis, it was found that a molar ratio of Li:Ni:Mn:Fe is 1.08:0.45:0.45:0.10. As a result of the measurement of powder X-ray diffraction, the crystal structure belongs to the R-3m space group.

2. Discharge Rate Test of Nonaqueous Electrolyte Secondary Battery

Using $R_3$, a nonaqueous electrolyte secondary battery was produced and a discharge rate test was carried out to find that the discharge capacities (mAh/g) at 0.2C, 1C, 5C and 10C were 118, 100, 76 and 51, respectively, and the discharge capacity retentions (%) thereof were 100, 85, 64 and 43, respectively. The results of a discharge capacity retention of a discharge capacity at 10C to an initial discharge capacity at 0.2C are shown in Table 1.

Comparative Example 3

1. Preparation of Electrode Active Material

After weighing 2.0 g of $R_3$ and 2.0 g of $R_2$ (100 parts by weight of $R_3$ relative to 100 parts by weight of $R_2$), respectively, they were sufficiently mixed by an agate mortar to yield an electrode active material $R_4$.

2. Discharge Rate Test of Nonaqueous Electrolyte Secondary Battery

Using $R_4$, a nonaqueous electrolyte secondary battery was produced and a discharge rate test was carried out to find that the discharge capacities (mAh/g) at 0.2C, 1C, 5C and 10C were 152, 132, 110 and 85, respectively, and the discharge capacity retentions (%) thereof were 100, 87, 72 and 56, respectively. The results of a discharge capacity retention of a discharge capacity at 10C to an initial discharge capacity at 0.2C are shown in Table 1.

TABLE 1

| Examples | Amount of second lithium mixed metal oxide mixed (parts by weight) | Amount of first lithium mixed metal oxide mixed (parts by weight) | Discharge capacity retention at 10 C. (%) |
|---|---|---|---|
| Comparative Example 1 | 100 | 0 | 58 |
| Example 1 | 100 | 43 | 82 |
| Example 2 | 100 | 100 | 79 |
| Example 3 | 100 | 233 | 77 |
| Example 4 | 100 | 900 | 75 |
| Example 5 | 100 | 11 | 75 |
| Example 6 | 100 | 25 | 79 |
| Comparative Example 2 | 0 | 100 | 43 |
| Comparative Example 3 | 100 | 100 | 56 |

The values of BET specific surface areas in the respective lithium mixed metal oxides used in Examples and Comparative Examples are summarized in Table 2.

TABLE 2

| Examples | BET specific surface area of second lithium mixed metal oxide (m$^2$/g) | BET specific surface area of first lithium mixed metal oxide (m$^2$/g) |
|---|---|---|
| Comparative Example 1 | 0.3 | — |
| Example 1 | 0.3 | 7.8 |
| Example 2 | 0.3 | 7.8 |
| Example 3 | 0.3 | 7.8 |
| Example 4 | 0.3 | 7.8 |
| Example 5 | 0.3 | 7.8 |
| Example 6 | 0.3 | 7.8 |
| Comparative Example 2 | — | 2.3 |
| Comparative Example 3 | 0.3 | 2.3 |

Production Example of Laminate Film (1) Preparation of Coating Liquid

Calcium chloride (272.7 g) was dissolved in 4,200 g of NMP, and then 132.9 g of para-phenylenediamine was added and dissolved completely. To the resultant solution was added gradually 243.3 g of terephthalic dichloride (hereinafter, abbreviated to TPC) and polymerization thereof was carried out to yield a para-aramide, and this was diluted further with NMP, to yield a para-aramide solution (A) having a concentration of 2.0% by weight. To 100 g of the resultant para-aramide solution was added 2 g of an alumina powder (a) (manufactured by Nippon Aerosil Co., Ltd., Alumina C, average particle size 0.02 μm, particles are generally spherical and have an aspect ratio of 1) and 2 g of an alumina powder (b) (Sumicorandom AA03 manufactured by Sumitomo Chemical Co., Ltd., average particle diameter 0.3 μm, particles are generally spherical and have an aspect ratio of 1) as a filler in a total amount of 4 g, and these were mixed and treated three times by a nanomizer, and further, filtrated through a 1,000 mesh wire netting, and de-foamed under reduced pressure to produce a slurry-formed coating liquid (B). The weight of the alumina powders (filler) relative to the total weight of the para-aramide and the alumina powders was 67% by weight.

(2) Production of Laminate Film

A polyethylene porous film (thickness 12 μm, air permeability 140 sec/100 cc, average pore size 0.1 μm, porosity 50%) was used as the porous film. On a PET film having a thickness of 100 μm, the polyethylene porous film was fixed, and the slurry-form coating liquid (B) was applied on the porous film by a bar coater manufactured by Tester Sangyo Co., Ltd. The PET film integrated with the coated porous film was immersed into water that was a poor solvent to cause deposition of a para-aramide porous film (heat resistant porous layer), and then the solvent was dried to yield a laminate film 1 in which a heat resistant porous layer and a porous film were stacked each other. The thickness of the laminate film 1 was 16 μm, and the thickness of the para-aramide porous film (heat resistant porous layer) was 4 μm. The laminate film 1 had an air permeability of 180 sec/100 cc, and a porosity of 50%. The cross section of the heat resistant porous layer in the laminate film 1 was observed by a scanning electron microscope (SEM) to find that relatively small micropores of about 0.03 μm to 0.06 μm and relatively large micropores of about 0.1 μm to 1 μm were present. As described above, para-aramid as a nitrogen-containing aromatic polymer is used in the heat resistant porous layer of the laminate film 1, and the thermal film rupture temperature of the laminate film 1 is about 400° C. Evaluation of the laminate film was carried out by the following method.

(3) Evaluation of Laminate Film (A) Measurement of Thickness

The thickness of the laminate film and the thickness of the porous film were measured according to JIS standard (K7130-1992). As the thickness of the heat resistant porous layer, a value obtained by subtracting the thickness of the porous film from the thickness of the laminate film was used.

(B) Measurement of Air Permeability by Gurley Method

The air permeability of the laminate film was measured by digital timer mode Gurley type Densometer manufactured by Yasuda Seiki Seisakusho Ltd., according to JIS P8117.

(C) Porosity

A sample of the resultant laminate film was cut into a square having a side length of 10 cm, and the weight W (g) and the thickness D (cm) thereof were measured. The weights (Wi (g)) of the respective layers in the sample were measured, and the volumes of the respective layers were calculated from Wi and the true specific gravities (true specific gravity i (g/cm³)) of the materials of the respective layers, and the porosity (% by volume) was calculated according to the following formula.

Porosity (% by volume)=100×{1−(W1/true specific gravity 1+W2/true specific gravity 2+ . . . +Wn/true specific gravity n)/(10×10×D)}

In the above Examples, a nonaqueous electrolyte secondary battery capable of more preventing thermal film rupture can be obtained when the laminate film is used as a separator.

Industrial Applicability

According to the present invention, there is provided a nonaqueous electrolyte secondary battery which can show a higher power output at a high current rate, that is, a nonaqueous electrolyte secondary battery which is superior in rate property. According to the present invention, it is also possible to increase a discharge capacity of a secondary battery and to provide a nonaqueous electrolyte secondary battery for automobiles and power tools such as electrical tools.

The invention claimed is:

1. An electrode active material comprising a mixture of 10 parts by weight to 900 parts by weight of a first lithium mixed metal oxide and 100 parts by weight of a second lithium mixed metal oxide, wherein:

the first lithium mixed metal oxide is in a powder form and has a BET specific surface area of 3 m²/g or more and 30 m²/g or less;

the second lithium mixed metal oxide is in a powder form and has a BET specific surface area of 0.1 m²/g or more and 2 m²/g or less; and the first lithium mixed metal oxide is constituted of primary particles having a diameter within a range of 0.01 μm or more and 0.5 μm or less, and aggregated particles having an average diameter of 0.05 μm or more and 2 μm or less formed by aggregating primary particles particles having a diameter within the above range.

2. The electrode active material according to claim 1, wherein the first lithium mixed metal oxide contains Fe.

3. The electrode active material according to claim 2, wherein the first lithium mixed metal oxide is represented by the formula (1):

$$\mathrm{Li(Ni_{1-x-y}Mn_xFe_y)O_2} \quad (1)$$

wherein, x is more than 0 and less than 1,
y is more than 0 and less than 1, and
x+y is more than 0 and less than 1.

4. The electrode active material according to claim 3, wherein x is 0.1 or more and 0.7 or less, y is 0.01 or more and 0.5 or less, and x+y is 0.11 or more and less than 1.

5. The electrode active material according to claim 1, wherein the second lithium mixed metal oxide is constituted of primary particles having a diameter within a range of 0.1 μm or more and 1 μm or less, and aggregated particles having an average diameter of 3 μm or more and 20 μm or less formed by aggregating primary particles having a diameter within the above range.

6. The electrode active material according to claim 1, wherein the second lithium mixed metal oxide contains Ni or Co.

7. The electrode active material according to claim 6, wherein the second lithium mixed metal oxide is represented by the formula (2):

$$\mathrm{Li(Ni_{1-a-b}Co_aM_b)O_2} \quad (2)$$

wherein, M represents one or more kinds selected from the group consisting of Ti, V, Mn, B, Al and Ga, a is 0 or more and 1 or less, b is 0 or more and 0.5 or less, and a+b is 0 or more and less than 1.

8. An electrode comprising the electrode active material according to claim 1.

9. A nonaqueous electrolyte secondary battery comprising the electrode according to claim 8 as a positive electrode.

10. The nonaqueous electrolyte secondary battery according to claim 9, further comprising a separator.

11. The nonaqueous electrolyte secondary battery according to claim 10, wherein the separator comprises a laminate film in which a heat resistant porous layer and a porous film are stacked each other.

12. An electrode active material which is obtained by mixing a powdery first lithium mixed metal oxide having a BET specific surface area of 3 $m^2/g$ or more and 30 $m^2/g$ or less with a powdery second lithium mixed metal oxide having a BET specific surface area of 0.1 $m^2/g$ or more and 2 $m^2/g$ or less in a mixing ratio of 10 parts by weight or more and 900 parts by weight or less of the first lithium mixed metal oxide per 100 parts by weight of the second lithium mixed metal oxide, wherein the first lithium mixed metal oxide is constituted of primary particles having a diameter within a range of 0.01 μm or more and 0.5 μm or less, and aggregated particles having an average diameter of 0.05 μm or more and 2 μm or less formed by aggregating primary particles having a diameter within the above range.

* * * * *